April 4, 1950     C. H. REISS     2,503,070
ROLLER BEARING AND ROLLER CAGE THEREFOR
Filed Jan. 19, 1949     2 Sheets-Sheet 1
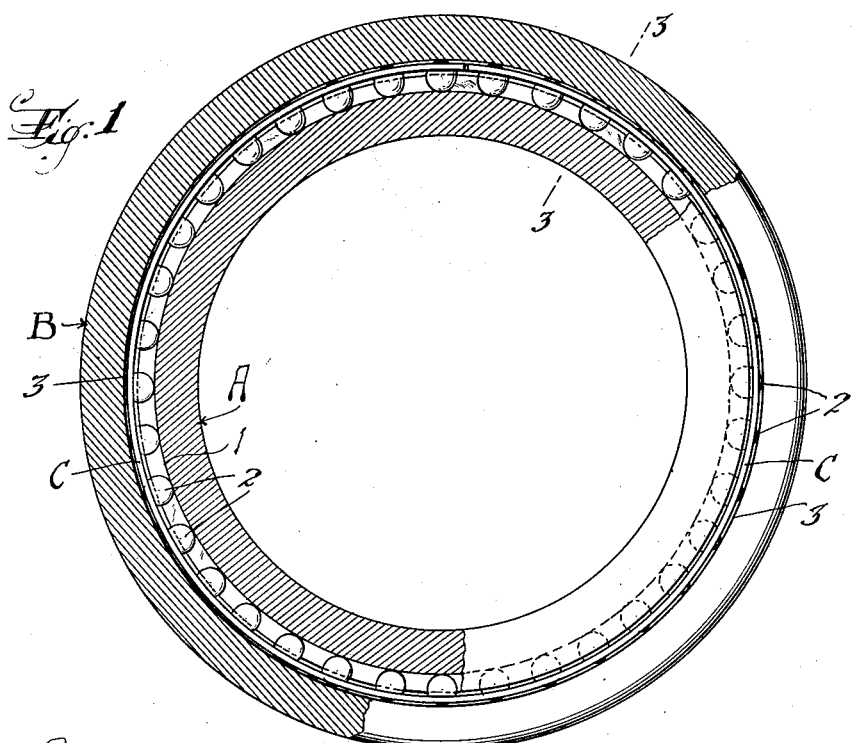
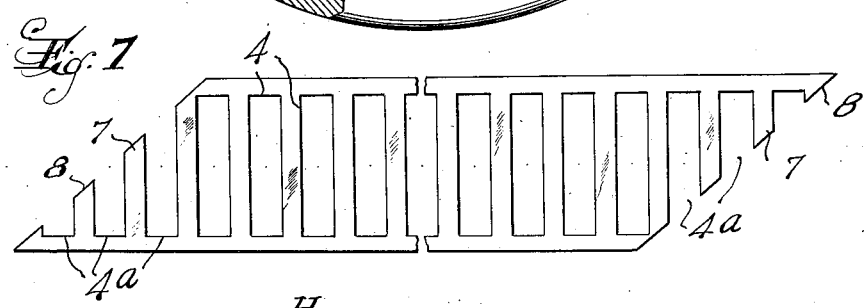
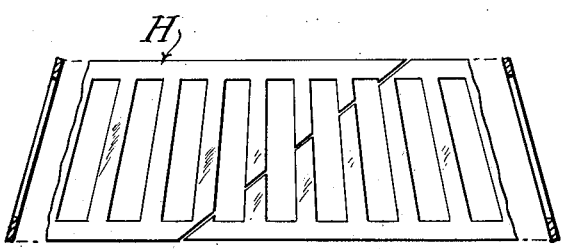
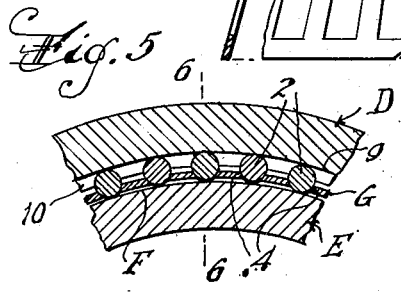
Inventor:
Christian H. Reiss,
BY

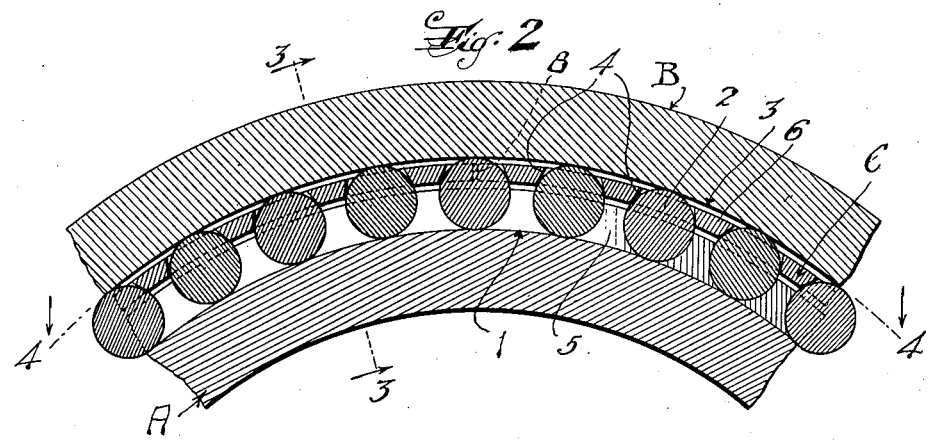
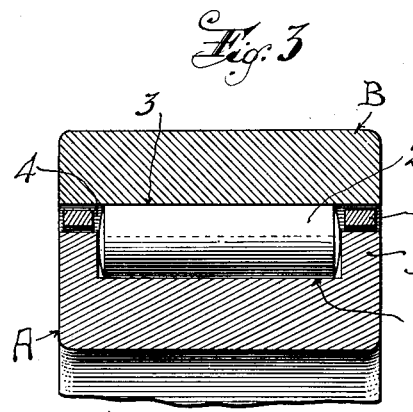
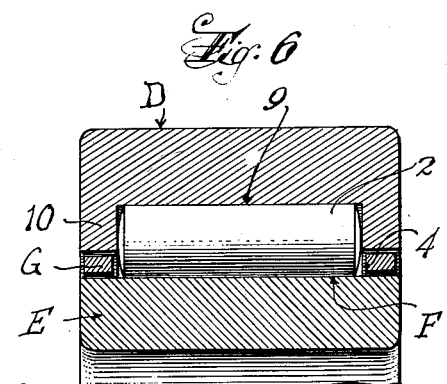
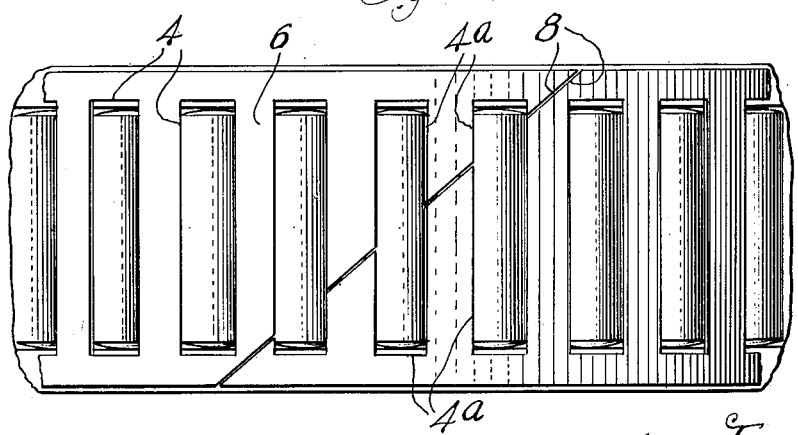

Patented Apr. 4, 1950

2,503,070

UNITED STATES PATENT OFFICE 2,503,070

ROLLER BEARING AND ROLLER CAGE THEREFOR

Christian Henry Reiss, Summit, N. J.

Application January 19, 1949, Serial No. 71,680

5 Claims. (Cl. 308—217)

This invention relates particularly to roller bearings of the type including hollow cylindrical cages for rollers having a plurality of parallel slots extending therethrough and longitudinally thereof, and a roller in each of said slots whose diameter is slightly greater than the thickness of the cage so that the periphery of the rollers extends beyond the exterior and interior surfaces of the cage. A roller bearing of this character has the cage disposed between two race rings or between a race ring and a shaft or journal or other bearing element with the diametrically opposite portions of the peripheries of the rollers engaging respectively the race ways in said race rings or in the race rings and the shaft, journal or other bearing element. More especially the invention is concerned with such roller bearings at least one raceway of which is channel-shaped or has integral flanges at its ends.

A prime object of the invention is to provide such a roller bearing which shall embody novel and improved features of construction to facilitate the assembly of the rollers and the cage in the channel-shaped raceway of the bearing.

Another object is to provide a roller bearing of this character having the roller cage formed from a resilient strip of sheet metal rolled into a split cylindrical shape and provided with the roller retaining slots or spaces and novel and improved means for securing the ends of the rolled strip or the juxtaposed edges of the split cylindrical cage together, whereby the cage may be expanded or contracted and inserted endwise into the channel-shaped raceway with the rollers associated therewith, and thereafter said juxtaposed edges of the split-cylindrical cage can be secured together with the rollers in proper operative relation to the cage and to the raceways.

A further object is to provide such a roller bearing wherein the cage embodies novel and improved features of construction whereby the juxtaposed edges of the cage can be secured together by the rollers themselves after the cage and rollers have been arranged between the cooperating raceways.

Other objects, advantages and results of the invention will be brought out by the following description in conjunction with the accompanying drawings in which Figure 1 is an end elevational view of the bearing embodying my invention, partially broken away and shown in section;

Figure 2 is an enlarged fragmentary central vertical longitudinal sectional view through the bearing;

Figure 3 is fragmentary transverse vertical sectional view approximately on the plane of the line 3—3 of Figure 2;

Figure 4 is a fragmentary plan view of the cage and the roller assembled therewith approximately on the curved plane of the line 4—4 of Figure 2, with the other race ring removed;

Figure 5 is a view similar to Figure 2 illustrating a different type of roller bearing;

Figure 6 is an enlarged transverse vertical sectional view approximately on the plane of the line 6—6 of Figure 5;

Figure 7 is a plan view of the flat strip from which the cage is formed, portions thereof being broken away; and, Figure 8 is a vertical sectional view through a cage embodying the invention specifically designed for a tapered bearing, portions of the cage being broken away.

Specifically describing the embodiment of the invention illustrated in Figures 1 to 4 inclusive, the reference character A designates the inner race ring of a roller bearing which may be mounted on a shaft or other suitable support and has a channel-shaped raceway 1 to receive the anti-friction rollers 2. Cooperating with the inner race ring A is an outer race ring B which has an interior raceway 3.

Disposed between the race rings A and B is a roller retaining or cage C which has a plurality of circumferentially spaced slots 4 extending therethrough and longitudinally thereof in each of which is located one of the rollers 2. With this construction, diametrically opposite portions of each roller contact with the raceways 1 and 3 respectively, the rollers are held in properly spaced relation and axial movement of the rollers is limited by engagement of the ends thereof with the flanges 5 of the channel-shaped raceway 1. The side walls of the slots 4 are so arranged and the diameter of the cage is such that said side walls of the slots will engage the peripheries of the rollers outwardly beyond the axes of the rollers so that the web portions 6 of the cage between the slots will prevent radial outward movement of the rollers, as best shown in Figure 2.

The roller retainer or cage C may be formed in any suitable manner but is shown as stamped from a flat piece of metal that has inherent resiliency, in the form of a flat strip having the slots 4 therein, as shown in Figure 7. In accordance with the invention the ends of the strip are inclined or beveled transversely of the strip as indicated at 7 so that certain of said slots open through the oblique ends of the strip and the portions 4a of said certain slots at one end of the strip will be aligned with the slot portions 4a at the other end of the strip when the strip is rolled into cylindrical form. After the strip has been formed as shown in Figure 7, it is shaped into cylindrical form with the end edges 8 in juxtaposed relation or abutting contact as shown in Figures 2 and 4 and with the portions 4a of the slots 4 at one end of the strip in longitudinal alinement with the portions 4a of the corresponding slots at the other end of the strip. Thus, when the rollers 2 are laid in the slots, the rollers in the slot portions 4a will bridge or cross the joint between the end edges 8 of the cage and thereby secure the ends of the cage together. It will be observed that the oblique juxtaposed ends 7 of the strip thus form a segmentally helical line of joinder or abutment for the edges of the cage.

In assembling the cage and rollers between the race rings, the rollers may be set into the slots 4 from the inner circumference of the cage and temporarily held in proper relation to the slots by any suitable fixture of other means, and the ends of the cage may be sprung apart to expand the cage so that it with the rollers may be slipped over one of the flanges 5 of the inner race ring A whereupon the end portion of the cage may be released to permit the cage to resiliently contract into its normal relation to the cage and the race ring. When the cage is contracted to its normal condition, the rollers in the slot portions 4a securely hold the ring against expansion or contraction. Thereafter the outer ring may be slipped over the rollers in the usual way.

In Figures 5 and 6 I have shown the invention embodied in another type of bearing which includes a channel-shaped outer race ring D having a raceway 9 at opposite ends of which are flanges 10, and an inner race ring E having a cylindrical exterior raceway F.

With this form of bearing, the roller retainer or cage G is of such dimensions and the side walls of the slots 4 are so shaped that the slot walls will engage the peripheries of the rollers inwardly of the axes of the rollers as shown in Figures 5 and 6. The structure of the cage is otherwise the same as that hereinbefore described, including the beveled end edges 8 and the complemental slot portions 4a.

In assembling the cage and rollers in the outer race ring, the rollers are laid in the slots by any suitable means and the end portions of the cage are sprung into overlapping condition so as to contract the cage to permit it and the associated rollers to be inserted within one of the flanges 10 and into the raceway 9, after which the end portions of the cage are released and permitted to spring outwardly into normal relation to the rollers and the raceway. The rollers in the slot portions 4a will secure the ends of the cage together just as in the form of the bearing shown in Figures 1 to 4 inclusive.

It will be understood by those skilled in the art that the invention may be adapted to various types of bearings and particularly to tapered roller bearings. Figure 8 shows a cage H embodying the invention in frusto-conical form for use in a tapered roller bearing. Except for its frusto-conical shape, the cage H is the same as the cages C and G.

While I have shown the cage as embodying certain details of construction and formed in a certain manner, it should be understood that this is primarily for the purpose of illustrating the now preferred embodiment of the invention and that the structural details of the cage and the manner of assembling it with the rollers in the raceways, may be modified and changed within the spirit and scope of the invention.

I claim:

1. In a roller bearing, the combination of bearing elements having cooperative raceways at least one of which is channel-shaped, rollers between and engaging said raceways, and a resilient cylindrical roller cage having a slot therein for each roller, said cage being split from end to end along a helical line and transversely of certain of said slots, and the rollers in said certain slots crossing said line to secure the ends of the cage together.

2. In a roller bearing, the combination of bearing elements having cooperative raceways at least one of which is channel-shaped, rollers between and engaging said raceways, and a resilient cylindrical roller cage having circumferentially spaced slots for said rollers and web portions between them forming walls for said slots, said cage having a helical slit extending through both ends and transversely of certain of said web portions, and the rollers in said certain slots bridging said slit and engaging said slot walls on said web portions at opposite sides of said slit.

3. In a roller bearing, the combination of bearing elements having cooperative raceways at least one of which is channel-shaped, rollers between and engaging said raceways, and a resilient cylindrical roller cage comprising a strip of resilient metal having oblique ends and slots for rollers spaced longitudinally thereof certain of which open through said oblique ends, there being web portions between said slots forming walls therefor, said strip being shaped into hollow cylindrical form with said oblique ends in juxtaposed relation and meeting in a helical line and said slots that open through one end of the strip being in alinement with the slots that open through the other end and said rollers in said slots engaging the slot walls at opposite sides of said meeting line of said ends of the strip, whereby the last-mentioned rollers secure the ends of said strip together.

4. A roller cage comprising a strip of resilient metal having oblique ends and slots for rollers spaced longitudinally thereof certain of which open through said oblique ends, there being web portions between said slots forming walls therefor, said strip being shaped into hollow cylindrical form with said oblique ends in juxtaposed relation and meeting in a helical line and said slots that open through one end of the strip being in alinement with the slots that open through the other end so that rollers placed in said slots that open through the ends of the strip will engage the slot walls at opposite sides of said meeting line of said ends of the strip and hold said ends against relative movement circumferentially of the cage.

5. A roller cage comprising a hollow cylinder of resilient metal having circumferentially spaced slots for rollers therein and web portions between them forming roller-engaging walls for the slots, said cage having a helical slit extending through both ends and transversely of certain of said web portions, whereby said cage can be expanded or contracted circumferentially by movement of said ends away from or toward each other respectively and rollers placed in the slots whose walls are formed by said certain web portions will bridge said slit and hold said hollow cylinder against such expansion or such contraction.

CHRISTIAN HENRY REISS.

No references cited.